Patented Apr. 7, 1953

2,633,919

UNITED STATES PATENT OFFICE 2,633,919

TREATMENT OF OIL-BEARING FORMATIONS

Robert F. Bauer, Santa Maria, and John E. Sherborne, Whittier, Calif., assignors to Union Oil Company of California, Los Angeles, Calif., a corporation of California No Drawing. Application June 19, 1948, Serial No. 34,148

4 Claims. (Cl. 166—21)

This invention relates broadly to methods for increasing the yield of oil from oil-bearing formations. More specifically, this invention relates to methods for the chemical treatment of the formations surrounding oil well bores whereby the permeability to oil flow is increased and the permeability to water flow is decreased.

Investigation has indicated that the rate of petroleum production from a given well is governed and limited by the degree of water saturation in the formation immediately surrounding the well. This belief is in conformity with the concept that permeability to the flow of a particular fluid in multiphase fluid flow through a permeable sand varies directly with the per cent saturation of that fluid in the pores of the sand. It follows that a process which reduces the water saturation and increases the oil saturation of the sand adjacent to the well bore, such as this invention comprises, concomitantly increases the productivity of the oil well.

According to the present invention the formation is dried and is then treated with a silicone-forming agent which agent is in part adsorbed and/or retained by the formation. The agent is subsequently converted by hydrolysis to a solid silicone polymer which is strongly bonded to the surface of the formation. Formations which have been coated by this method are more resistant to water wetting and are more susceptible to oil wetting.

It is therefore a primary object of this invention to coat the formation surrounding an oil well with either a bonded or an adsorbed layer of silicone polymer whereby the potential yield of oil from the well is increased.

It is another object of this invention to eliminate and/or inhibit the formation of water sheathes and water cones around an oil well by the deposition of a layer of solid bonded silicones on the surfaces of the formation.

Another object of this inveniotn is to coat an oil-bearing formation with silicone polymers so as to render it more permeable to oil flow, to decrease the water saturation of the formation, and to restrict water flow from the formation into the well.

This invention in particular relates to the treatment of oil-bearing formations of formations which surround oil wells whereby the formation is rendered more permeable to oil flow and less permeable to water flow. In the event that the formation to be treated contains appreciable amounts of water, it is first dried by solvent washing, heating or the like. A silicone-forming agent in a suitable solvent is introduced into the relatively dry or dried formation and after placement therein is hydrolyzed by treatment with water to form a hydrophobic coating on the surfaces of the formation. Oil flow is generally greater through a coated formation than through an uncoated one.

The term "silicone" or "silicone polymer" is herein employed to denote a class of organosilicon compounds which have been developed commercially during recent years. The characteristic linkage of the silicones comprises an alternating linkage between silicon and oxygen atoms. The silicon atom has four valence bonds. One, two or three of the valence bonds of each silicon atom in a silicon is or are attached to oxygen atoms and the remaining three, two or one bonds respectively, are or is attached to alkyl or aryl radicals.

Silicons are prepared by hydrolyzing such compounds as mono-alkyl silicon halides, di-alkyl silicon halides, tri-alkyl silicon halides, mono-aryl silicon halides, di-aryl silicon halides, tri-aryl silicon halides or mixtures thereof. Mixed aryl and alkyl mono-, di- or tri-substituted silicon halides may also be employed.

The hydrolysis of these halides to form silicones is effected by treating the compound with one mole of water, or water vapor, per gram atom of chlorine to be hydrolyzed and preferably with about one to ten times this amount. The hydrolysis is carried at atmospheric or elevated pressures as desired and at temperatures above 25° C. The hydrolysis of substituted silicon containing less than 10 carbon atoms per molecule is rapid and complete at 25° C. and atmospheric pressure. The higher molecular weight halides often require heat and/or pressure to complete the hydrolysis of the silicon halide and effect subsequent condensation.

The substituted silicon halides are prepared by reacting a silicon halide or a substituted silicon halide with the appropriate Grignard reagent according to the following reactions:

(1) $SiX_4 + R_1MgX \rightarrow R_1SiX_3 + MgX_2$
(2) $R_1SiX_3 + R_2MgX \rightarrow R_1R_2SiX_2 + MgX_2$
(3) $R_1R_2SiX_2 + R_3MgX \rightarrow R_1R_2R_3SiX + MgX_2$ In the above sequence of reactions the radicals $R_1$, $R_2$ and $R_3$ are alkyl and/or aryl radicals as desired and X is selected from the class of iodine, bromine, and chlorine, whichever is suitable and convenient for the preparation of the desired Grignard reagent.

An alternative method for the preparation of silicone polymers involves the reaction of any of the aforedescribed silicon halides with an alcohol such as methanol, ethanol, propanol and the like to form the corresponding ester and the subsequent hydrolysis of the ester to form the alcohol, and the silicone. The intermediate esters may be advantageously employed in those cases where the direct hydrolysis of the silicone halide itself would be too violent.

The choice of a particular silicon halide for the preparation of silicone polymers is governed by the physical properties of the silicone desired and its intended usage. For the purposes of this invention we may employ those substituted silicon halides which contain between 1 and 20 carbon atoms per molecule and preferably between 1 and 12 carbon atoms per molecule. The silicon halides containing fewer carbon atoms than 20 per molecule are more readily bonded to the formation and are therefore preferred to the halides containing more than 20 carbon atoms.

The basic building units for silicone polymers comprises three types, namely, chain stopping units, chain continuing units, and chain cross-linking units. These units are derived from the hydrolytic products of tri-substituted silicon halides, di-substituted silicon halides and mono-substituted silicon halides, respectively. The basic linkage of the silicone compounds involves an alternating linkage between silicon and oxygen atoms wherein the silicon is derived from the silicon halide and the oxygen is entered by replacement of the halogen with a hydroxyl group and subsequent dehydration and condensation among the hydroxyl groups.

A tri-substituted silicon halide is a mono-functional unit since it has but one silicon-chlorine bond which is replaceable by a single silicon-oxygen bond. The hydrolytic product derived from a tri-substituted silicon halide can only serve to block the end of a silicon-oxygen chain from further chain lengthening reaction. Di-substituted silicon halides are bi-functional in nature since each of the two halogens is replaceable with a hydroxyl group which allows this unit to condense in two directions and, therefore, increases the linear length of a chain until blocked by a mono-functional group mentioned previously. Similarly, the halogens of the mono-substituted silicon halides are replaceable by hydroxyl groups which may then condense to form polymers. These building units are tri-functional in that they permit the growth of the polymer in three directions. The three directional growth of the polymer results in numerous cross-linkages by the linear chains and decreases mobility of the resultant polymer and increases its resinous character.

A wide variety of silicone polymers ranging from the simple dimer resulting from the condensation of two mono-functional units, to the purely linear type polymer derived from the co-condensation of a number of bi-functional units, to the very complex three dimensional polymers derived from the inter-condensation of numerous tri-functional units, can be prepared from appropriate starting materials. The use of varying mixtures of these three classes of chain building units permits a wide range of polymeric types of silicones to be prepared.

A convenient method for characterizing the polymeric type of a given silicone is the ratio of R/Si which represents the numerical ratio of the number of alkyl and/or aryl groups per atom of silicon. In the polymers derived from tri-functional units the ratio R/Si is 3, for polymers derived from bi-functional groups the ratio is 2, and polymers derived from tri-functional units have a ratio of 1.

Polymers which are prepared from mixtures of the three building units have an R/Si ratio which is the weighted average of ratios of the individual units. A polymer having an R/Si ratio of about 1.5 may be prepared, for example, by the hydrolysis of an equal molal mixture of a di-substituted and mono-substituted silicon halides. In general, where $x$, $y$, and $z$ are the mole fractions of the mono-, di-, and tri-substituted silicon halides respectively in a mixture of silicon halides to be hydrolyzed and condensed to polymers and $(R/Si)_0$ is the desired R/Si ratio in the polymer the following relationships are valid:

(A) $\quad x+y+z=1$ (B) $\quad 1x+2y+3z=(R/Si)_0$

The two Equations A and B contain three variables and are therefore indeterminant without a third and independent relationship involving one or more of these variables. The third condition is determined by the choice of the mole fraction of any of the components to be employed, for example, the mole fraction of the tri-substituted halide to be employed $(z)$. Thus, if $z$ is chosen to be the value $z_0$, then (C) $\quad\quad\quad\quad z=z_0$ and Equations A, B and C are determinant.

In one embodiment of our invention a silicone polymer is prepared on the surfaces of the oil-bearing formation surrounding a newly completed well bore to form a hydrophobic coating. The water saturation of this type of formation is usually relatively low and the oil saturation is correspondingly high. Whenever the water saturation of the formation to be coated exceeds about 5 per cent by weight it is necessary to dry the formation by the use of heating and/or solvent washing according to the methods hereinafter described for the drying of formations surrounding producing wells preparatory to coating with silicones.

A silicone-forming agent is employed to synthesize the silicone on the surfaces of the formation. The term silicone-forming agent is used to denote any and all compounds which form silicone polymers by their reaction with water such as any of the silicon halides, or esters derived therefrom, which have been described hereinbefore or mixtures thereof.

For coating an oil-bearing formation a mixture of silicone-forming agents is employed such that the silicone polymer obtained thereby has an R/Si ratio of between 1.2 and 1.8. Suitable silicone-forming agents comprise mixtures of between 20 and 80 mole per cent of a mono-substituted alkyl or aryl silicon halide or ester and between 80 and 20 mole per cent of a di-substituted alkyl, aryl or alkyl-aryl silicon halide or ester. Mixtures of mono-, di- and tri-substituted silicon halides or mixtures of mono- and tri-substituted silicon halides having R/Si ratios of between 1.2 and 1.8 may be employed similarly.

The mixture of silicone-forming agents is dissolved in a hydrocarbon solvent such as benzene, gasoline, kerosene, crude oil and the like, or in a chlorinated solvent such as chloroform, carbon tetrachloride, ethylene dichloride and the like or in any other suitable solvent. Although concentrated solutions of the silicone-forming agents may be employed, it is desirable to use dilute solutions such as those which contain between 0.1 and 5% by weight of the silicone-forming agents. The more dilute solutions furnish a better coating of the formation and do not tend to cause blocking and/or plugging of the formation by the aggregation of the silicon polymer such as tends to occur when more concentrated solutions are contacted with water.

The solution is forced through the well bore and into the oil-bearing formation. All or a part of the silicone-forming material is absorbed and/or retained in close proximity of the component surfaces of the formation. If desired, a wash solvent such as any of the aforementioned hydrocarbon or chlorinated solvents is forced into the formation after the placement of the silicone-forming solution in order to wash away a part of any excess silicone-forming agent and also to distribute the silicone-forming agent at distances still further from the well bore. After the placement of the silicone-forming agent on or near the surfaces of the formation and following the use of the wash solvent the silicone-forming agent is hydrolyzed to form the silicone polymer by pumping a water-containing mixture into the formation. Suitable water-containing mixtures include water, steam, solutions of water in such solvents as methanol, ethanol, diethyl ether, methyl ethyl ketone and the like, or oil-water emulsions containing any desired concentration of water. Suitable oil-water emulsions are prepared by emulsifying the water with an oil such as kerosene, diesel fuel, crude oil, and the like in the presence of an emulsifying agent such as sodium stearate, potassium oleate, sodium naphthenate, triethanolamine and the like. The entry of the water-containing mixture into the formation serves to drive the silicone-forming solution and/or wash solvent ahead of it and away from the bore hole and to hydrolyze the adsorbed and/or retained silicone-forming agent in its advancing wake. It is desirable to avoid the use of a large excess of water above and beyond the theoretical amount required for the hydrolysis reaction. For the hydrolysis it is preferable to employ an amount of water which is between one and ten times the theoretical amount.

Following the coating of the formation by the hydrolysis of the silicone-forming agent, the well is produced in the normal fashion whereby the water, solvents and/or excess silicone-forming agent flow from the oil-bearing zone and into the bore hole, after which the oil itself is produced. Although water has contacted the oil-bearing formation in the vicinity of the well bore, it is not retained by the formation since the coated formation tends to be hydrophobic. Accordingly, the coated formation is highly permeable to the oil flow and tends to restrict the entry of water into the zone from neighboring zones and also tends to facilitate the transport of the oil in the oil-bearing formation toward the bore hole.

In another embodiment of this invention we may coat an oil-bearing or water-bearing formation surrounding a producing well with silicone polymers in order to increase the permeability of these formations to oil flow and decrease the permeability to water flow. After a well has been produced for an appreciable period of time, water cones or sheathes are often formed in the oil-bearing formation which impede or restrict the free passage of the oil to the well bore. Such water cones or sheathes must be removed preparatory to coating the formation with a silicone polymer, which coating inhibits any tendency to reform the water cone or sheath.

In the preferred method for drying the formation preparatory to coating the formation, an anhydrous liquid having an affinity for water such as methanol, ethanol, isopropyl alcohol, acetone, methyl ethyl ketone, dioxane or the like is pumped through the well bore into the formation wherein the water is dissolved by the anhydrous solvent and swept away from the well bore in the advancing front of the solvent. After the formation in the vicinity of the bore hole which is to be coated has been substantially freed of water, a solution of a silicone-forming agent in a suitable solvent, such as those solutions which have been described hereinbefore for the coating of newly completed well bores, is pumped through the bore hole and thence into the formation wherein the solvent is swept away from the bore hole which in turn forces the solution of the water in the solvent ahead of its advancing front. After the solution of the silicone-forming agent has remained in contact with the formation for a period sufficiently long to adsorb a part of the agent, such as from 1 to 10 days, the pressure of the bore hole is released and the fluids are caused to flow from the formation into the bore hole whereupon the solvent and excess agent are swept out by the advancing anhydrous solvent, which anhydrous solvent is followed by the solution of the water in the solvent. The solution of the water in the solvent ultimately contacts and hydrolyzes the retained agent, whereby a bonded silicone polymer is formed on the surfaces of the formation. Continued pumping of the well produces mixtures of solvent and oil and finally straight crude oil. The oil-wetted and coated formation is thereafter resistant to any tendencies toward reforming water sheathes or water cones, the reforming of which would again lower the permeability of the formation to oil flow.

Although in the preferred modification for the coating of producing wells the water present in the formation is utilized in hydrolyzing the silicone-forming agent, the agent may be hydrolyzed by pumping water-containing mixtures into the formation following the placement of the agent in the formation in the same manner as was described hereinbefore for the hydrolysis of the agent to form the coating on the formations surrounding newly completed well bores. Substantially the same concentrations of silicone-forming agent and solvents are employed in coating both newly completed and producing well bores.

Methods for drying the formation other than the solvent wash method described hereinbefore may be advantageously employed to prepare the formation for the coating operation. In one such modification an electrical resistance heater is placed in the bore hole in the proximity of the formation to be treated. The heater vaporizes the water in the nearby formation and drives it away from the area to be treated. Natural gas or other inert gas may also be forced into the bore hole to act as a carrier for the water vapor to sweep it away from the bore hole. After the formation has been dried the heater is removed from the bore hole and the silicone-forming solution is forced into the formation. Following the placement of the silicone-forming solution in the dried formation, the hydrolysis is carried out by forcing a water-containing mixture into the formation in the manner described hereinbefore. Following the hydrolysis, the well is produced to yield first the excess water-containing mixture and then the oil itself.

Having fully described and illustrated the principles of our invention we wish to claim the following:

1. A process for improving the production of oil from an oil-bearing formation comprising drying said oil-bearing formation; injecting into the dried formation an organic solvent solution containing between about 0.1 and about 5.0 per cent by weight of a silicone-forming agent selected from the class consisting of alkyl and aryl substituted silicon halides and alkyl and aryl substituted silicon esters in which the alkyl and aryl radicals of said silicone-forming agent contain between 1 and 20 carbon atoms, and in which the ratio of said radicals to silicon is between about 1.2 and about 1.8; allowing said solution of silicone-forming agent to remain in contact with the dried formation for a period of time sufficient to allow a coating of said silicone-forming agent to be adsorbed on the surfaces of said formation; withdrawing from the formation the silicone-forming agent which is in excess of that forming said adsorbed coating; and injecting water into said formation to hydrolyze said adsorbed coating of silicone-forming agent, thereby forming an oil-wettable coating of silicone polymer on the surfaces of the oil-bearing formation.

2. A process according to claim 1 wherein said drying is effected by washing said oil-bearing formation with a solvent.

3. A process according to claim 1 wherein said drying is effected by heating.

4. A process according to claim 1 wherein said solution containing said silicone forming agent comprises a solution of a silicone forming agent in a solvent selected from the class consisting of hydrocarbons and chlorinated hydrocarbons.

ROBERT F. BAUER.
JOHN E. SHERBORNE.

REFERENCES CITED

The following references are of record in the file of this patent:

UNITED STATES PATENTS

| Number | Name | Date |
| --- | --- | --- |
| 2,246,725 | Garrison | June 24, 1941 |
| 2,259,875 | Bent et al. | Oct. 21, 1941 |
| 2,402,588 | Andresen | June 25, 1946 |
| 2,469,354 | Bond | May 10, 1949 |